106. COMPOSITIONS, COATING OR PLASTIC.

Patented Nov. 21, 1922.

1,436,061

UNITED STATES PATENT OFFICE.

GEORGE B. STRYKER AND FRANK A. MANTEL, OF MEMPHIS, TENNESSEE, ASSIGNORS TO STRYKER KOT-N-WOOD PRODUCTS COMPANY, OF MEMPHIS, TENNESSEE, A CORPORATION.

LUMBER SUBSTITUTE.

No Drawing. Application filed May 6, 1921. Serial No. 467,306.

*To all whom it may concern:*

Be it known that we, GEORGE B. STRYKER and FRANK A. MANTEL, both citizens of the United States, each residing at Memphis, in the county of Shelby and State of Tennessee, have invented certain new and useful Improvements in Lumber Substitute; and we do hereby declare the following to be a full, clear, and exact description of the invention, such as will enable others skilled in the art to which it appertains to make and use the same.

This invention relates to compositions of matter suitable for use as artificial lumber and has for its object to provide a composition of this character which will be comparatively inexpensive to manufacture and more efficient in use than those heretofore proposed.

With these and other objects in view, the invention consists in the novel ingredients and combinations of ingredients constituting the product, all as will be more fully disclosed below and particularly pointed out in the claims.

Owing to the growing scarcity of lumber throughout the United States, and in certain regions in particular, it has become highly desirable to provide some substitute therefor which may be cheaply and readily manufactured, preferably from waste products, and which may be utilized for substantially all purposes to which lumber is ordinarily put. Throughout the Southern States a vast amount of cellulosic material in the form of cotton stalks is now going to waste, which we have found may be combined with certain other materials to produce an excellent artificial lumber.

In carrying out the present invention we preferably take from 4 to 8 parts of vegetable ash, either wood or coal ashes, which may be screened to remove any large lumps, with which we mix from one to two parts of Portland or other hydraulic cement. Should a particular color be desired in the final product, a powdered mineral pigment or coal tar dye may be here added to produce the desired shade. To this mixture there is next added from 12 to 16 parts of ground cotton stalks or other cellulosic substance, and the whole is thoroughly mixed. The mixture is then intimately moistened with a solution of commercial sodium silicate, of from 38° to 42° Bé., and sufficient water is added to produce a pasty mass.

This mass may be worked into almost any desired form, dependent upon the final use to which the product is to be put. For instance, if it is to be employed as a wall board, or as siding for houses, it may be readily formed into sheets or slabs of suitable dimensions; or if it is to be used as flooring or for street pavements, it may be molded into blocks. When so formed, pressure should be applied to compact the mass and expel any surplus water, the amount of pressure again depending upon the final product. If a relatively light and porous product is wished, the amount of pressure should be correspondingly small, not exceeding, say, ten pounds. On the other hand, should a product be desired having a greater density, more pressure should be applied, up to, say, 100, 200, or even 500 pounds or more, depending upon the density sought.

The slabs or blocks may then be permitted to dry in air, whereupon they will be ready for use, and may be nailed, sawed, or cut substantially the same as ordinary lumber. They will have a comparatively smooth finish, due to the ashes, which act as a filler for the interstices of the cotton stalks or other base material, and the whole will be firmly bound together by the binding cement. The sodium silicate, or "water glass," which has been thoroughly incorporated in the mass, renders the final product both water and fireproof.

In order to facilitate the setting or hardening of the slabs or blocks, they may, if desired, be dipped after forming, into a solution of calcium chloride, or calcium oxide, which latter, upon exposure to the air in drying, will be converted into calcium carbonate $CaCO_3$, as is well known. This step, however, need not be taken unless desired.

The product is susceptible of a wide range of uses, among which might be mentioned flooring and siding for houses, linings for coffins and metallic caskets, street pavements, etc.

It is obvious that those skilled in the art may vary the ingredients, as well as the proportions thereof, without departing from the spirit of the invention, and therefore, we do not wish to be limited to the above disclosure except as may be required by the claims.

What we claim is:

1. A lumber substitute comprising a mixture not exceeding 8 parts of vegetable ashes, and 16 parts of ground cotton stalks, to which has been added a hydraulic cement and sodium silicate, substantially as described.

2. A lumber substitute comprising from 4 to 8 parts of vegetable ashes, one to two parts of a hydraulic cement, 12 to 16 parts of ground cotton stalks, and sufficient sodium silicate to intimately moisten the same, the whole being pressed into shape, substantially as described.

3. A lumber substitute consisting essentially of from 4 to 8 parts of vegetable ashes, one to two parts of a hydraulic cement, 12 to 16 parts of ground cotton stalks, sufficient sodium silicate to intimately moisten the same, sufficient calcium chloride to saturate the mass when first formed; and the whole pressed into shape, substantially as described.

In testimony whereof we affix our signatures.

GEORGE B. STRYKER.
FRANK A. MANTEL.